United States Patent
Osuka et al.

(10) Patent No.: US 9,544,494 B2
(45) Date of Patent: Jan. 10, 2017

(54) IMAGING APPARATUS

(71) Applicant: Panasonic Intellectual Property Management Co., Ltd., Osaka (JP)

(72) Inventors: Kyosuke Osuka, Osaka (JP); Koji Shibuno, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/613,401

(22) Filed: Feb. 4, 2015

(65) Prior Publication Data
US 2015/0222809 A1    Aug. 6, 2015

(30) Foreign Application Priority Data

Feb. 5, 2014    (JP) ................. 2014-020035

(51) Int. Cl.
H04N 5/232    (2006.01)
H04N 5/235    (2006.01)
G03B 13/36    (2006.01)

(52) U.S. Cl.
CPC .......... *H04N 5/23212* (2013.01); *G03B 13/36* (2013.01); *H04N 5/2356* (2013.01); *H04N 5/23216* (2013.01); *H04N 5/23293* (2013.01)

(58) Field of Classification Search
CPC ............ H04N 5/23212; H04N 5/23216; H04N 5/23293; G03B 13/36
See application file for complete search history.

(56) References Cited

U.S. PATENT DOCUMENTS

| | | | |
|---|---|---|---|
| 2006/0044452 A1* | 3/2006 | Hagino | G02B 7/28 348/345 |
| 2007/0110422 A1* | 5/2007 | Minato | G06K 9/00248 396/89 |
| 2010/0134642 A1* | 6/2010 | Thorn | G02B 7/287 348/222.1 |
| 2010/0188522 A1* | 7/2010 | Ohnishi | H04N 5/2254 348/222.1 |
| 2011/0267530 A1* | 11/2011 | Chun | G06F 3/04883 348/333.11 |

(Continued)

FOREIGN PATENT DOCUMENTS

| | | |
|---|---|---|
| JP | 2008-064797 | 3/2008 |
| JP | 2009-044382 | 2/2009 |
| JP | 2010-008620 | 1/2010 |

*Primary Examiner* — Paul Berardesca
(74) *Attorney, Agent, or Firm* — Wenderoth, Lind & Ponack, L.L.P.

(57) ABSTRACT

An imaging apparatus according to the present disclosure includes an imaging unit configured to generate image data by imaging an object image; a displaying unit configured to display the image data and a focus area superimposed on the image data, the focus area being a set of a plurality of focus frames; a determination unit configured to determine a number and positions of arbitrary focus frames selected from the focus area; and a control unit configured to control the imaging unit and the determination unit, and to perform focus processing on an image. The control unit performs the focus processing according to a plurality of selected focus frames when the determination unit determines that the plurality of selected focus frames are located at positions not adjacent to each other.

1 Claim, 10 Drawing Sheets

(56) References Cited

U.S. PATENT DOCUMENTS

| | | | |
|---|---|---|---|
| 2013/0135510 A1* | 5/2013 | Lee .................... | H04N 5/23293 |
| | | | 348/333.02 |
| 2014/0139721 A1* | 5/2014 | Choi .................. | H04N 5/23212 |
| | | | 348/345 |
| 2016/0028948 A1* | 1/2016 | Omori ................ | H04N 5/23229 |
| | | | 348/239 |

* cited by examiner

IMAGING APPARATUS

BACKGROUND

1. Technical Field

The present disclosure relates to an imaging apparatus that performs auto focusing control.

2. Description of the Related Art

PTL 1 discloses an imaging apparatus that displays an imaged image divided into a plurality of areas, allowing a user to specify an area including a target object, and moving the focus lens to perform focusing based on focusing information of the specified area.

CITATION LIST

Patent Literature

PTL 1: Unexamined Japanese Patent Publication No. 2010-8620

SUMMARY

It is an object of the present disclosure to provide an imaging apparatus capable of selecting a plurality of arbitrary focus positions, and capable of performing focus processing according to the plurality of selected focus positions.

The imaging apparatus according to the present disclosure includes an imaging unit configured to generate image data by imaging an object image; a displaying unit configured to display the image data and a focus area superimposed on the image data, the focus area being a set of a plurality of focus frames; a determination unit configured to determine a number and positions of arbitrary focus frames selected from the focus area; and a control unit configured to control the imaging unit and the determination unit, and to perform focus processing on an image. The control unit performs the focus processing according to a plurality of selected focus frames when the determination unit determines that the plurality of selected focus frames are located at positions not adjacent to each other.

The imaging apparatus according to the present disclosure is capable of selecting a plurality of arbitrary focus positions, and capable of performing focus processing according to the plurality of selected focus positions.

DETAILED DESCRIPTION OF THE PREFERRED EMBODIMENTS

In the following, exemplary embodiments will be described in detail with reference to the drawings as appropriate. However, a detailed description more than necessary may be omitted. For example, a detailed description of already well-known matters, and a duplicate description of substantially the same structure may be omitted. This is to facilitate the understanding of those skilled in the art by preventing the following description from becoming unnecessarily redundant.

Note that the accompanying drawings and the following description are provided so that those skilled in the art will thoroughly understand the present disclosure, and that it is not intended to limit the subject matter described in the claims by these.

1. First Exemplary Embodiment

1-1. Configuration

In the following, a configuration of digital camera 100 will be described with reference to FIGS. 1 to 7. Digital camera 100 is an example of an imaging apparatus.

Figure 1:
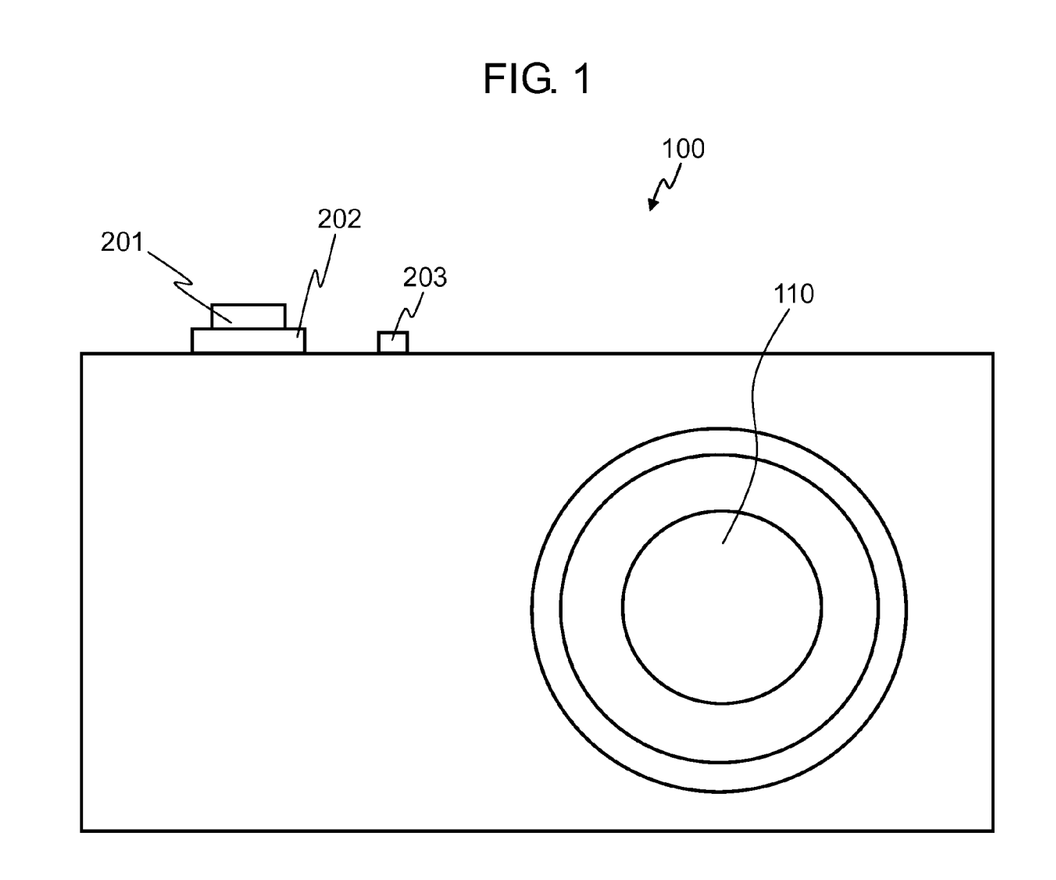
FIG. 1 is a front view of a digital camera according to a first exemplary embodiment.

FIG. 1 is a front view of digital camera 100. Digital camera 100 includes a lens barrel for housing optical system 110 on a front face. In addition, digital camera 100 includes operation buttons on a top face. The operation buttons include still image release button 201, zoom lever 202, and power supply button 203.

Figure 2:
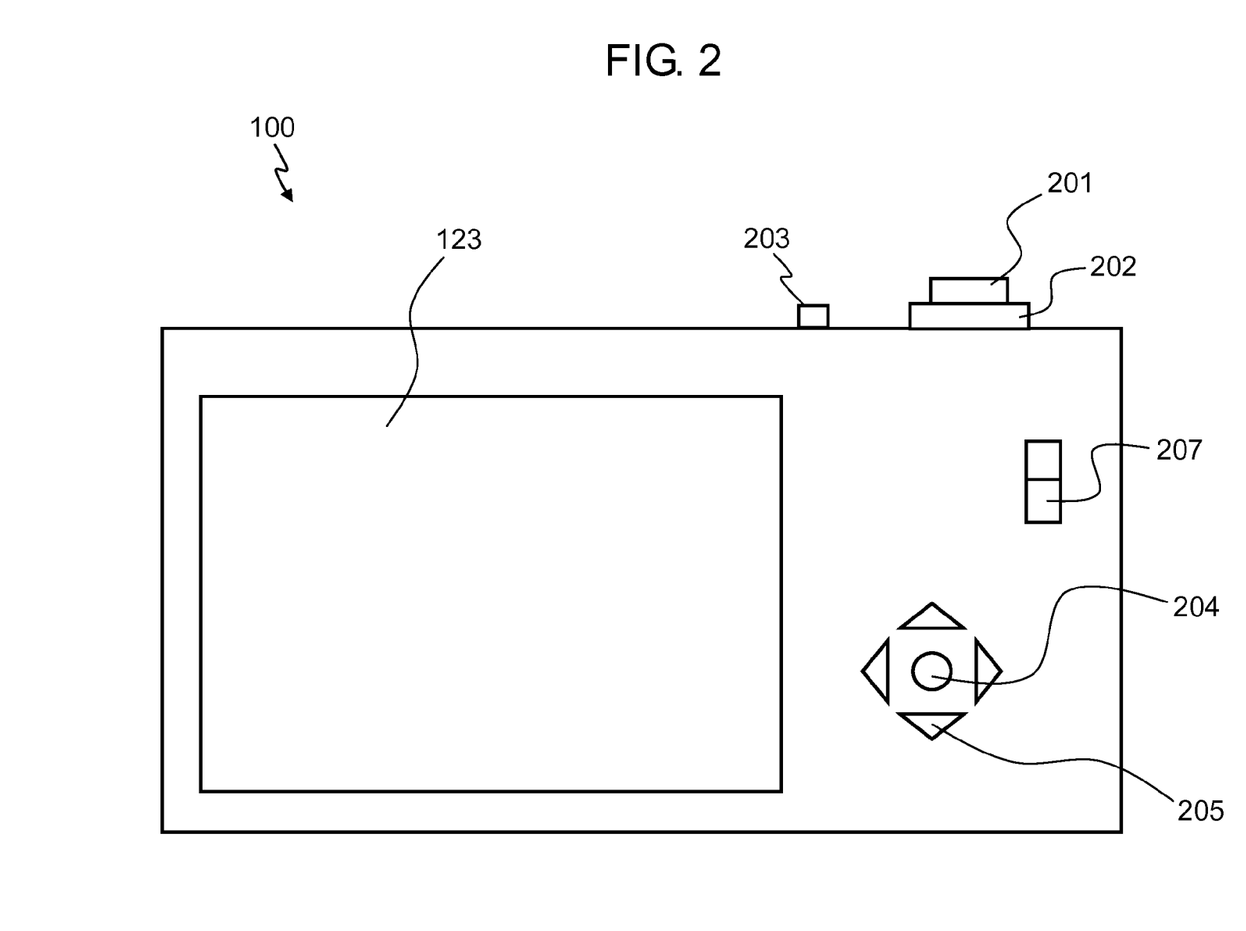
FIG. 2 is a rear view of the digital camera according to the first exemplary embodiment.

FIG. 2 is a rear view of digital camera 100. Digital camera 100 includes liquid crystal monitor 123 on a back face. As described below, liquid crystal monitor 123 accepts a touch operation of a user. In addition, digital camera 100 includes operation buttons on the back face. The operation buttons include center button 204, cross button 205, and mode change switch 207.

Figure 3:
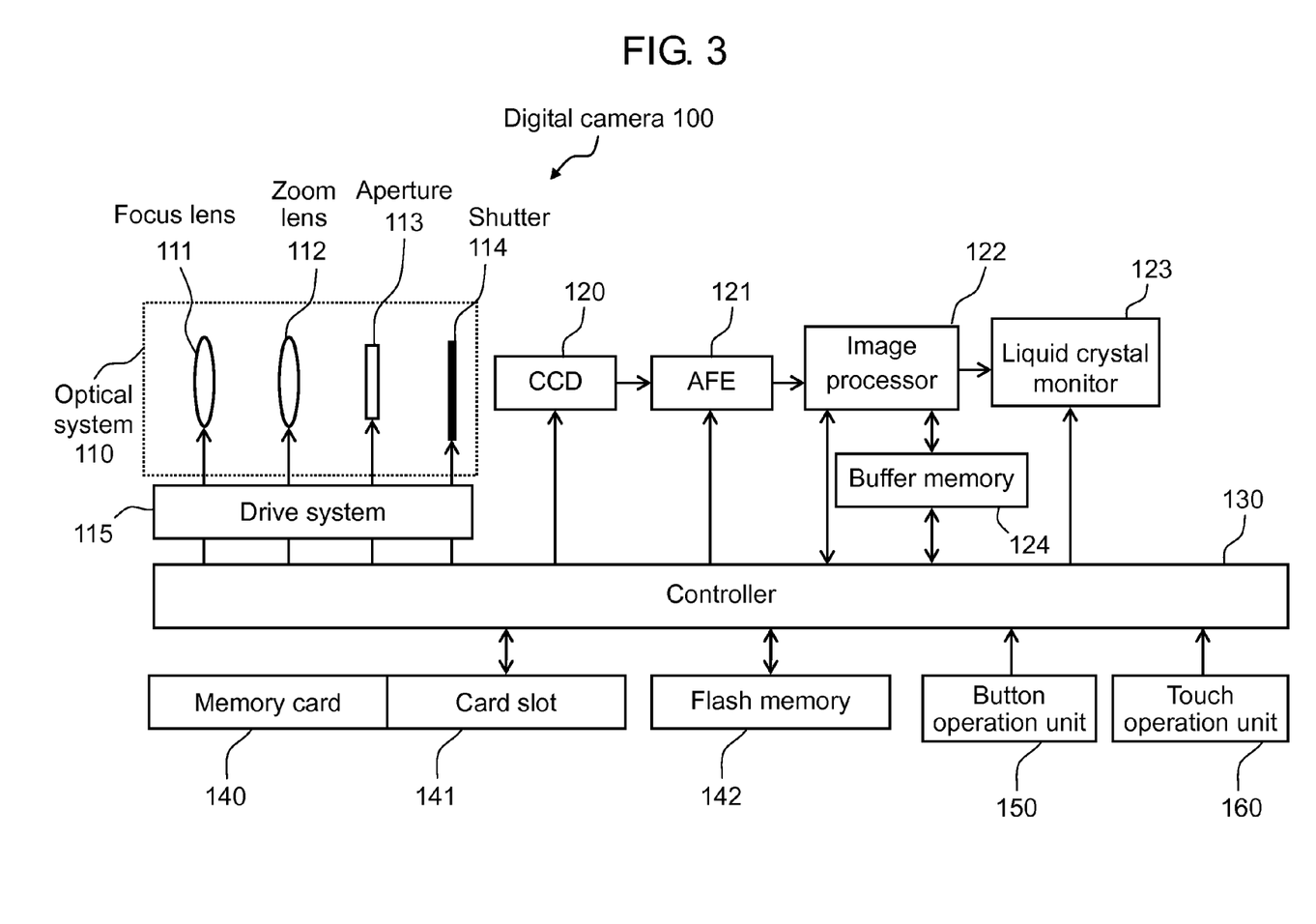
FIG. 3 is an electrical configuration diagram of the digital camera according to the first exemplary embodiment.

FIG. 3 is an electrical configuration diagram of digital camera 100. Digital camera 100 images an object image formed via optical system 110 by CCD image sensor 120. CCD image sensor 120 generates image data based on an imaged object image. Various types of processing are performed on the image data generated by the imaging in AFE (Analog Front End) 121 and image processor 122. The generated image data is recorded in flash memory 142 or memory card 140. The image data recorded in flash memory 142 or memory card 140 is displayed on liquid crystal monitor 123 upon reception of an operation of button operation unit 150 or touch operation unit 160 by the user. The following is a detailed description of each component shown in FIGS. 1 to 3.

Optical system 110 is configured by focus lens 111, zoom lens 112, aperture 113, and shutter 114. Although not shown, optical system 110 may include an OIS (Optical Image Stabilizer) lens. Note that each of various types of lenses constituting optical system 110 may be formed of any pieces or any groups of lenses.

Focus lens 111 is used to adjust a focus state of an object. Zoom lens 112 is used to adjust an angle of view of the object. Aperture 113 is used to adjust an amount of light incident on CCD image sensor 120. Shutter 114 adjusts an exposure time of the light incident on CCD image sensor 120.

Digital camera 100 includes drive system 115 that drives optical system 110. Examples of drive system 115 may include a DC motor and a stepping motor. Drive system 115 incorporates respective drive units corresponding to focus lens 111, zoom lens 112, aperture 113, and shutter 114. Optical system 110 is driven by drive system 115 according to a control signal notified from controller 130.

CCD image sensor 120 generates image data by imaging an object image formed through optical system 110. CCD image sensor 120 can generate image data of a new frame every predetermined time when digital camera 100 is in an image-recording mode.

AFE 121 processes the image data read out from CCD image sensor 120 to convert the image data into a digital signal. AFE 121 performs, on the image data, noise suppression by correlated double sampling, amplification to an input range width of an A/D converter by an analog gain controller, and A/D conversion by the A/D converter. Then, AFE 121 outputs the image data converted to the digital signal to image processor 122.

Image processor 122 performs various types of processing on the image data output from AFE 121. Examples of the various types of processing include smear correction, white balance correction, gamma correction, YC conversion processing, electronic zoom processing, compression processing, and decompression processing, but are not limited to these. Image processor 122 stores the image information obtained by the various types of processing in buffer memory 124. Image processor 122 may be configured by a hard-wired electronic circuit, or by a microcomputer and the like using a program. Alternatively, image processor 122 may be configured by one semiconductor chip together with controller 130 and the like.

Liquid crystal monitor 123 is provided on the back face of digital camera 100. Liquid crystal monitor 123 displays an image based on the image data processed by image processor 122. The image displayed by liquid crystal monitor 123 includes a through image or a recorded image. A through image is an image that continuously displays image data of a new frame generated at regular time intervals by CCD image sensor 120. Normally, when digital camera 100 is in the image-recording mode, image processor 122 generates a through image from the image data generated by CCD image sensor 120. The user can image an object while checking a composition of the object by referring to the through image displayed on liquid crystal monitor 123. The recorded image displayed on liquid crystal monitor 123 is an image reduced to low pixel count so that the image data of high pixel count recorded in memory card 140 and the like is displayed on liquid crystal monitor 123 when digital camera 100 is in a playback mode. High pixel-count image data to be recorded in memory card 140 is generated by image processor 122 based on the image data generated by CCD image sensor 120 after the operation on still image release button 201 by the user has been accepted.

Controller 130 comprehensively controls the operation of digital camera 100 as a whole. In addition, controller 130 records the image data, which is processed by image processor 122 and then stored in buffer memory 124, in a recording medium such as memory card 140. Controller 130 is configured by a ROM that stores information such as a program, a CPU that processes various pieces of information by executing the program, and the like. The ROM stores a program for comprehensively controlling the operation of digital camera 100 as a whole, in addition to a program related to file control, auto focusing (AF) control, automatic exposure (AE) control, and flash light emission control.

Controller 130 may be configured by a hard-wired electronic circuit or a microcomputer. In addition, controller 130 may be configured by one semiconductor chip together with image processor 122 and the like. Moreover, the ROM is not required to be an internal configuration of controller 130, and may be provided outside controller 130.

Buffer memory 124 is a storage unit serving as a work memory for image processor 122 and controller 130. Buffer memory 124 can be implemented by a DRAM (Dynamic Random Access Memory) and the like. Flash memory 142 serves as an internal memory for recording image data, setting information of digital camera 100, and the like.

Card slot 141 is a connection unit to which memory card 140 is detachably connected. Memory card 140 can be electrically and mechanically connected to card slot 141. Card slot 141 may have a function of controlling memory card 140.

Memory card 140 is an external memory that includes therein a recording unit such as a flash memory. Memory card 140 can record data such as image data to be processed by image processor 122.

Button operation unit 150 is a generic term of an operation button and an operation dial which are provided on an exterior of digital camera 100, and accepts an operation by the user. Button operation unit 150 includes still image release button 201, zoom lever 202, power supply button 203, center button 204, cross button 205, and mode change switch 207. Button operation unit 150 notifies the various operation instruction signals to controller 130 upon receipt of the operation by the user.

Touch operation unit 160 is an operation system equipped to liquid crystal monitor 123. When the user touches an icon or the like displayed on liquid crystal monitor 123, the touch operation unit notifies various operation instruction signals to controller 130. When digital camera 100 is in the image-recording mode, a through image is displayed on liquid crystal monitor 123. The user can specify the position for AF control by touching the position to be focused on liquid crystal monitor 123.

Still image release button 201 shown in FIGS. 1 and 2 is a two-stage push-type button of a half-pushed state and a fully-pushed state. When still image release button 201 is half-pushed by the user, controller 130 performs the AF control and the AE control to determine imaging conditions. Subsequently, when still image release button 201 is fully-pushed by the user, controller 130 performs imaging processing. Controller 130 records, as a still image, the image data imaged at the timing of the full-push in memory card 140. Hereinafter, when it is simply described that still image release button 201 is pushed, the description indicates a full-push.

Zoom lever 202 is a self-resetting lever that returns to a central position for adjusting an angle of view between a wide-angle end and a telephoto end. When zoom lever 202 is operated by the user, zoom lever 202 notifies the operation instruction signal for driving zoom lens 112 to controller 130. That is, when zoom lever 202 is operated to the wide-angle end, controller 130 drives zoom lens 112 so that the object is captured at the wide-angle end. Similarly, when zoom lever 202 is operated to the telephoto end, controller 130 drives zoom lens 112 so that the object is captured at the telephoto end.

Power supply button 203 is a push-type button for turning ON/OFF the power supply to each unit constituting digital camera 100. In a case where the power is OFF, when power button 203 is pushed by the user, controller 130 supplies power to each unit constituting digital camera 100 to start up digital camera 100. In a case where the power is ON, when power button 203 is pushed by the user, controller 130 stops power supply to each unit.

Center button 204 is a push-type button. In a case where digital camera 100 is in the image-recording mode or the playback mode, when center button 204 is pushed by the user, controller 130 displays a menu screen on liquid crystal monitor 123. The menu screen is a screen for setting various conditions for image-recording/playback. Information that is set in the menu screen is recorded in flash memory 142. In a case where center button 204 is pushed when any of the setting items of various conditions is selected, center button 204 also functions as a determining button.

Cross button 205 is a push-type button provided in vertical and horizontal directions. The user can select an item of the various conditions displayed on liquid crystal monitor 123 by pushing any of the directions of cross button 205.

Mode change switch 207 is a push-type button provided in the vertical direction. The user can switch the state of digital camera 100 to the image-recording mode or the playback mode by pushing any of the directions of mode change switch 207.

1-2. AF Control of Digital Camera

Figure 4:
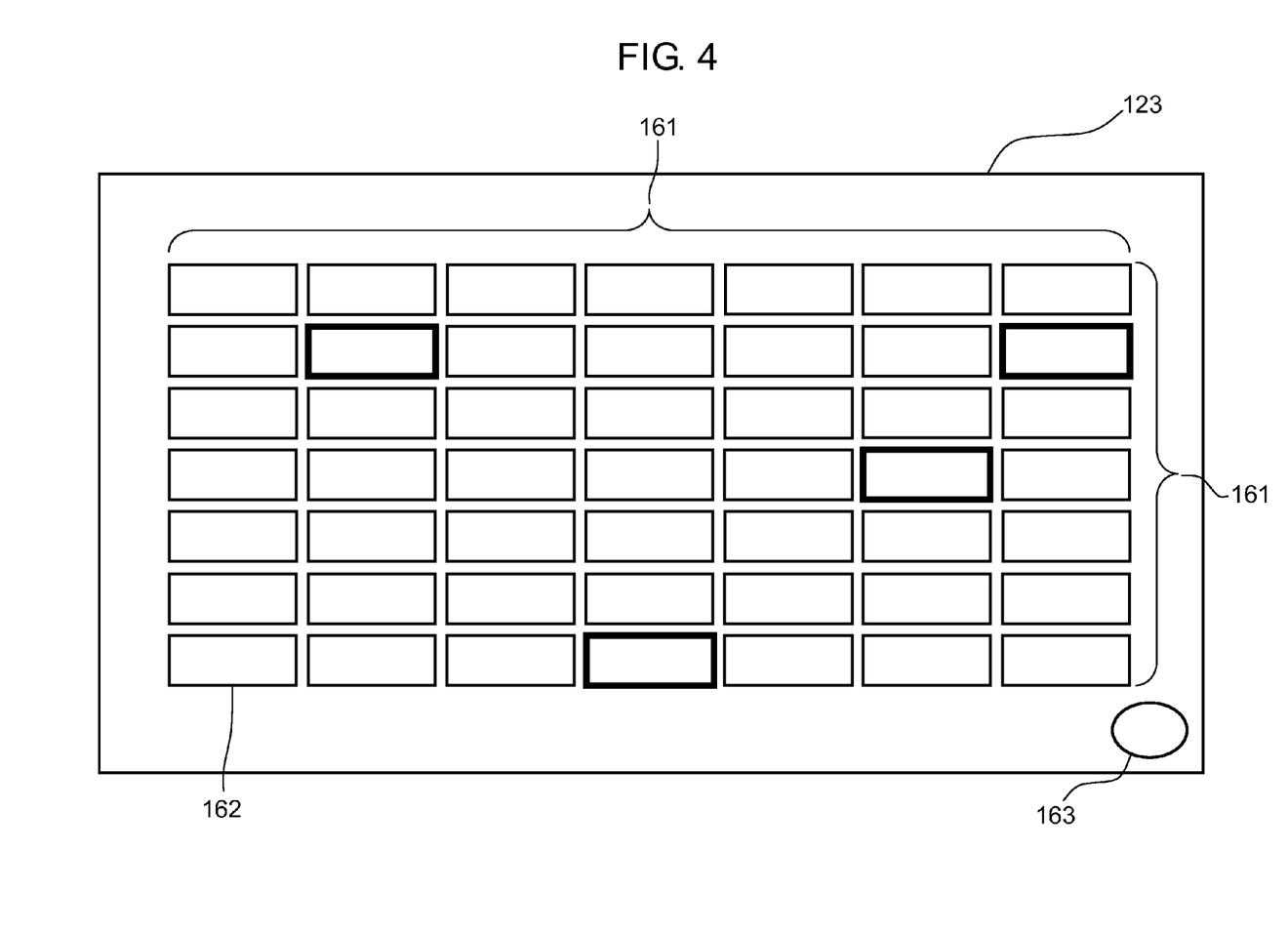
FIG. 4 is a diagram showing a display example of focus frames of the digital camera according to the first exemplary embodiment.

AF control of digital camera 100 configured as above will be described. Liquid crystal monitor 123 superimposes focus area 161 and focus frame 162, as shown in FIG. 4, on the image data so as to display. Liquid crystal monitor 123 can display clear button 163 on the outside of focus area 161.

Focus area 161 is an area where focusing can be performed in the imaged image. Focus frame 162 is each of frames obtained by dividing the focus area. The user can select arbitrary focus frames 162 from focus area 161 displayed on liquid crystal monitor 123. Digital camera 100 can perform the AF control so that the image displayed in focus frame 162 selected by the user is focused. In the present exemplary embodiment, focus area 161 is divided into a total of 49 focus frames 162 of 7 vertical frames×7 horizontal frames. Four thick-bordered focus frames 162 illustrated in FIG. 4 indicate focus frames 162 selected by the user.

The user can specify the position for AF control by touching the position to be focused on liquid crystal monitor 123. Touch operation unit 160 notifies the position touched by the user to controller 130. Controller 130 can perform the focus processing at the position notified from the touch operation unit.

The user can cancel the once touched position by touching clear button 163, and can specify a position to be focused by newly touching a position. Note that, instead of providing clear button 163, the once touched position can be canceled by touching the outside of focus area 161.

In digital camera 100, a plurality of systems can be selected during the AF control. Digital camera 100 has a system of selecting only one position to be focused (hereinafter referred to as "one-point AF"), and a system capable of selecting a plurality of arbitrary independent focus frames 162 (hereinafter referred to as "custom multi AF"). In the custom multi AF, the user can select a plurality of focus frames 162 that are not adjacent to each other together as the frames in which the AF control is performed. In the present exemplary embodiment, digital camera 100 uses a control system referred to as "contrast AF control" during the AF control.

[1-2-1. One-Point AF]

The contrast AF control will be described by taking as an example one-point AF that is a selection system of a focus position.

When digital camera 100 is in the image-recording mode, the object image imaged by optical system 110 is converted into image data by CCD image sensor 120. Then, after being processed through AFE 121 and image processor 122, the image data is displayed on liquid crystal monitor 123 as a through image. The user observes the through image displayed on liquid crystal monitor 123 to determine the angle of view and the like. The user selects only one of the positions to be focused from the through image displayed on liquid crystal monitor 123, and touches the selected position. Touch operation unit 160 determines a position touched by the user and notifies the position to controller 130. In the position notified by the touch operation unit, controller 130 performs the contrast AF control described below. Touch operation unit 160 is an example of the determination unit.

The contrast AF control is performed based on AF evaluation value calculated each time the image data is generated. The AF evaluation value is obtained by integrating the high frequency component of the luminance signal constituting the image data. Note that the AF evaluation value is also referred to as "contrast value". By comparing a plurality of calculated AF evaluation values, controller 130 determines the direction in which focus lens 111 is moved, and the focus state of the object image. The one-point AF performs control so that the AF evaluation value of the position specified by the user is the highest.

Figure 5:
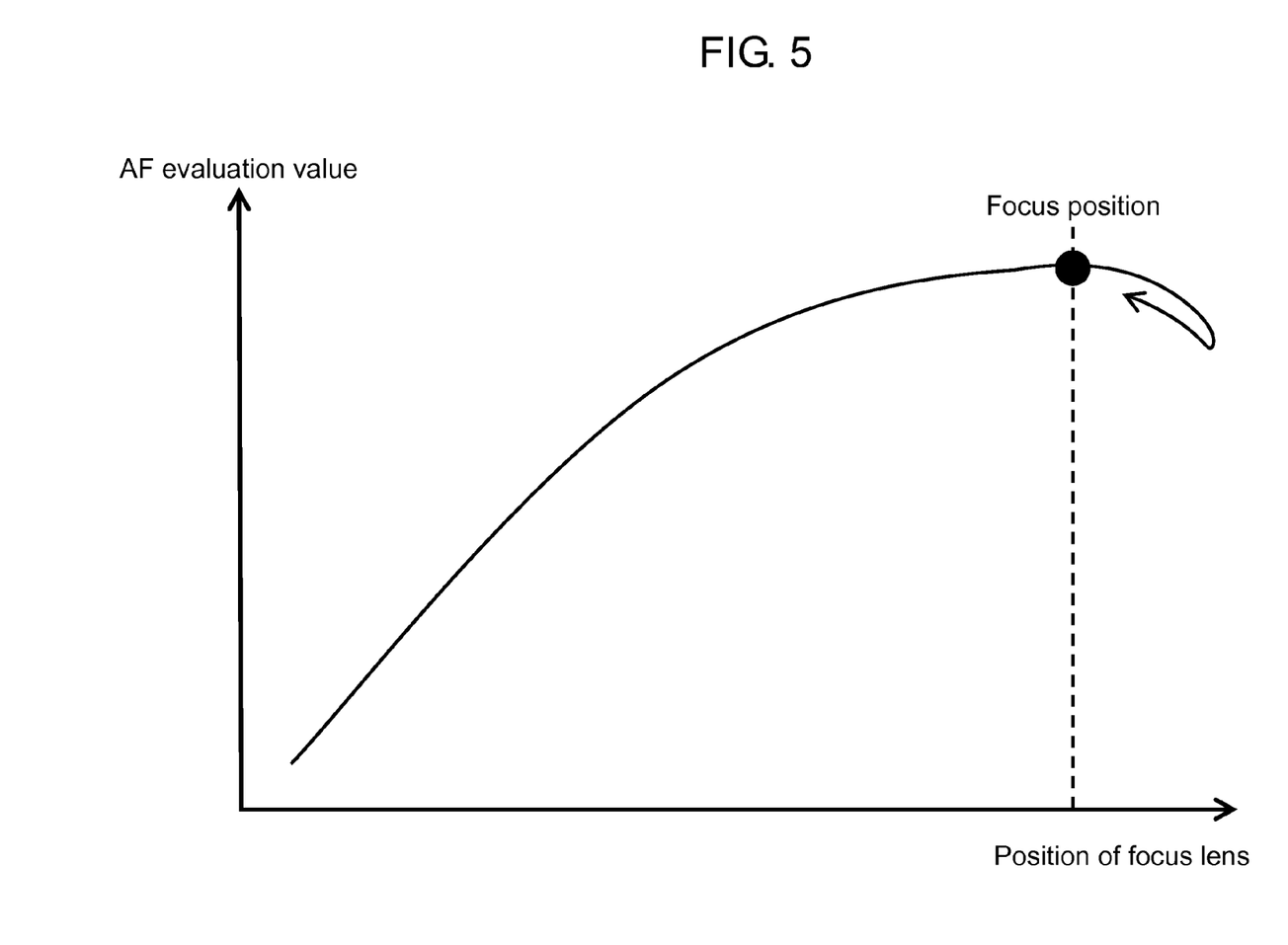
FIG. 5 is an auto focusing control schematic diagram according to the first exemplary embodiment.

FIG. 5 is a basic operation explanatory diagram of the AF control. A focus lens motor included in drive system 115 continues to drive focus lens 111 in one direction from an infinite end or a closest end. Controller 130 continues to periodically calculate the AF evaluation value along with the drive of focus lens 111. The focus lens motor continues to drive focus lens 111 in one direction as long as the AF evaluation value continues to rise. When the AF evaluation value stops rising, and then starts to fall, controller 130 determines to have passed through the focus position. Then, the focus lens motor drives focus lens 111 in the direction opposite to the previous direction, and moves focus lens 111 to the focus position that is the position of focus lens 111 when the AF evaluation value becomes highest. Controller 130 accepts the half-push operation on still image release button 201 by the user to perform the AF control operation. After the AF control operation, when focus lens 111 is moved to the focus position, controller 130 fixes focus lens 111 to the focus position. When the user performs a full-push operation on still image release button 201, controller 130 images the object image to record the imaged object image in memory card 140 or flash memory 142. Thereby, digital camera 100 can image the image that is focused on the intended position of the user.

[1-2-2. Custom Multi AF]

Next, the custom multi AF will be described. In the custom multi AF, the user can select a plurality of focus frames 162.

In the one-point AF, there is one selected position, and therefore, the AF evaluation value for the position may be utilized. However, in the custom multi AF, there are a plurality of selected frames, and therefore, there is a need to determine which frame to utilize with priority. If such a determination is not made, there is a possibility that a different frame is focused for each half-push operation even if the selected frames and the composition (situation of the object) are not changed, and it becomes difficult for the user to use the digital camera.

Thus, digital camera 100 according to the present exemplary embodiment performs weighting on a plurality of focus frames 162 selected by the user. Then, digital camera 100 selects focus frame 162 which is preferentially adopted for the AF control from focus frames 162 which are weighted.

In the present exemplary embodiment, there is illustrated a case of using, as one of weighting parameters on the selected frames, a distance from barycentric position G that is calculated based on positions of the plurality of selected focus frames 162 to each of focus frames 162 that are selected.

A specific operation during the custom multi AF in digital camera 100 until image data recording will be described with reference to FIG. 6.

First, when digital camera 100 proceeds to the image-recording mode by the operation of mode change switch 207 by the user, controller 130 performs initialization processing required for the still image recording. In this case, controller 130 displays a through image on liquid crystal monitor 123 and sets focus area 161 and focus frames 162 obtained by dividing focus area 161.

When the initialization processing is completed, the user can determine the focus positions. When the user touches liquid crystal monitor 123, touch operation unit 160 determines that focus frame 162 assigned to the touched position is selected (step S601). When the user selects a plurality of focus frames, controller 130 calculates barycentric position G based on the positions of all of the selected focus frames (step S602). Barycentric position G is normally a barycenter of the figure created by connecting the plurality of selected focus frames 162.

Next, digital camera 100 performs weighting on each of selected focus frames 162 based on calculated barycentric position G (step S603). Specifically, the weighting is performed according to the distance from barycentric position G to each of selected focus frames 162, in the order of closeness to barycentric position G. That is, as focus frame 162 is closer to barycentric position G, controller 130 sets a higher priority to the frame. The operation of performing weighting on each of selected focus frames 162 (steps S601 to S603) is performed each time the user selects focus frame 162.

Lastly, when accepting the half-push operation on still image release button 201 by the user, digital camera 100 performs the AF control (step S604). In this case, the focus position of the focus lens is determined by utilizing the AF evaluation value for the highest priority frame weighted in step S603.

Note that, when the AF evaluation value for focus frame 162 with the highest priority is low, digital camera 100 performs the calculation of the AF evaluation value also for another focus frame 162. That is, when the AF evaluation value for the frame with the highest priority is lower than a predetermined reference, digital camera 100 calculates the AF evaluation value in the order of decreasing precedence, and performs the calculation until an AF evaluation value higher than the predetermined reference can be obtained. In this case, digital camera 100 may perform the AF control in focus frame 162 with high priority. In addition, digital camera 100 may perform the AF control in focus frame 162 where a high AF evaluation value is obtained.

After performing the AF control, controller 130 accepts the full-push operation on still image release button 201 by the user. When the user fully pushes still image release button 201, controller 130 captures the generated image data. Then, controller 130 records the image data in flash memory 142 or memory card 140 (step S605).

Figure 7:
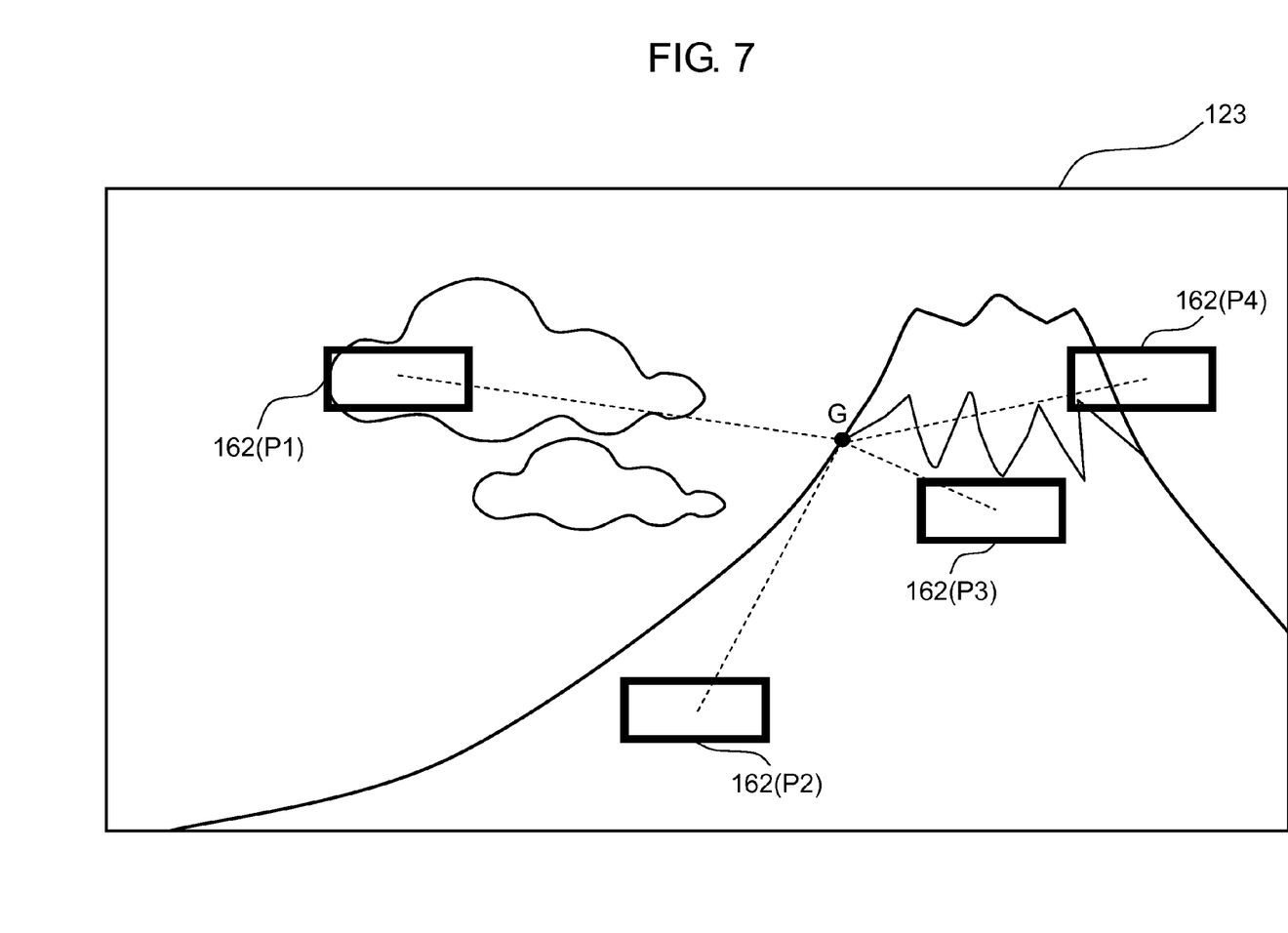
FIG. 7 is a schematic diagram of focus frame selection of the digital camera according to the first exemplary embodiment.

The method for prioritizing selected focus frames 162 will be specifically described with reference to FIG. 7. As shown in FIG. 7, the user selects four focus frames 162 at positions P1, P2, P3, and P4. In this case, controller 130 obtains the coordinate information of each of focus frames 162. Controller 130 calculates barycentric position G from the obtained coordinate information of the plurality of focus frames 162. When barycentric position G is calculated, controller 130 measures the distance from barycentric position G to each of focus frames 162. Then, controller 130 performs weighting on focus frames 162 in the order of closeness to barycentric position G. In FIG. 7, focus frame 162 at position P3 is the closest to barycentric position G, and therefore, controller 130 determines that the priority of focus frame 162 at position P3 is the highest. Then, the priorities are set in the order of positions P3, P4, P2, and P1, that is, in the ascending order of the distance from barycentric position G.

As described above, digital camera 100 according to the present exemplary embodiment can prioritize the plurality of focus frames 162 selected by the user. Thereby, as long as the number and the positions of selected focus frames 162 does not change, the AF control can be performed on same focus frames 162.

In the present exemplary embodiment, the method for performing weighting by using only barycentric position G is described, but the present disclosure is not limited thereto. In addition to barycentric position G, it is also possible to perform weighting on the frame by combining property information of the object such as the face and the body, the pattern of selected focus frames 162 (vertical column, horizontal row, and the like), the object distance (Depth From Defocus) information, the moving object determination using the motion vector (Motion Estimation), and the like, as parameters.

1-3. Effects and the Like

Digital camera 100 according to the present exemplary embodiment enables the selection of the plurality of arbitrary focus frames 162 by the user. In addition, digital camera 100 performs weighting on selected focus frame 162 using barycentric position G calculated from selected focus frames 162. With this configuration, even when the user selects a plurality of arbitrary focus frames 162, a case is prevented where focus frames 162 to be used vary each time the imaging is performed.

Digital camera 100 is also capable of registering the pattern of focus frames 162 selected by the user in flash memory 142. When a pattern of focus frames 162 is registered, the pattern of focus frames 162, which is used previously, can be invoked easily when the pattern is to be used again.

2. Second Exemplary Embodiment

Digital camera 100 according to the present exemplary embodiment generates an image where all of selected focus frames 162 are focused by synthesis processing. As for the configuration and the like of digital camera 100, the description of the same points as in the first exemplary embodiment will be omitted, and the points different from the first exemplary embodiment will be described.

[2-1. AF Control of Digital Camera]

Figure 8:
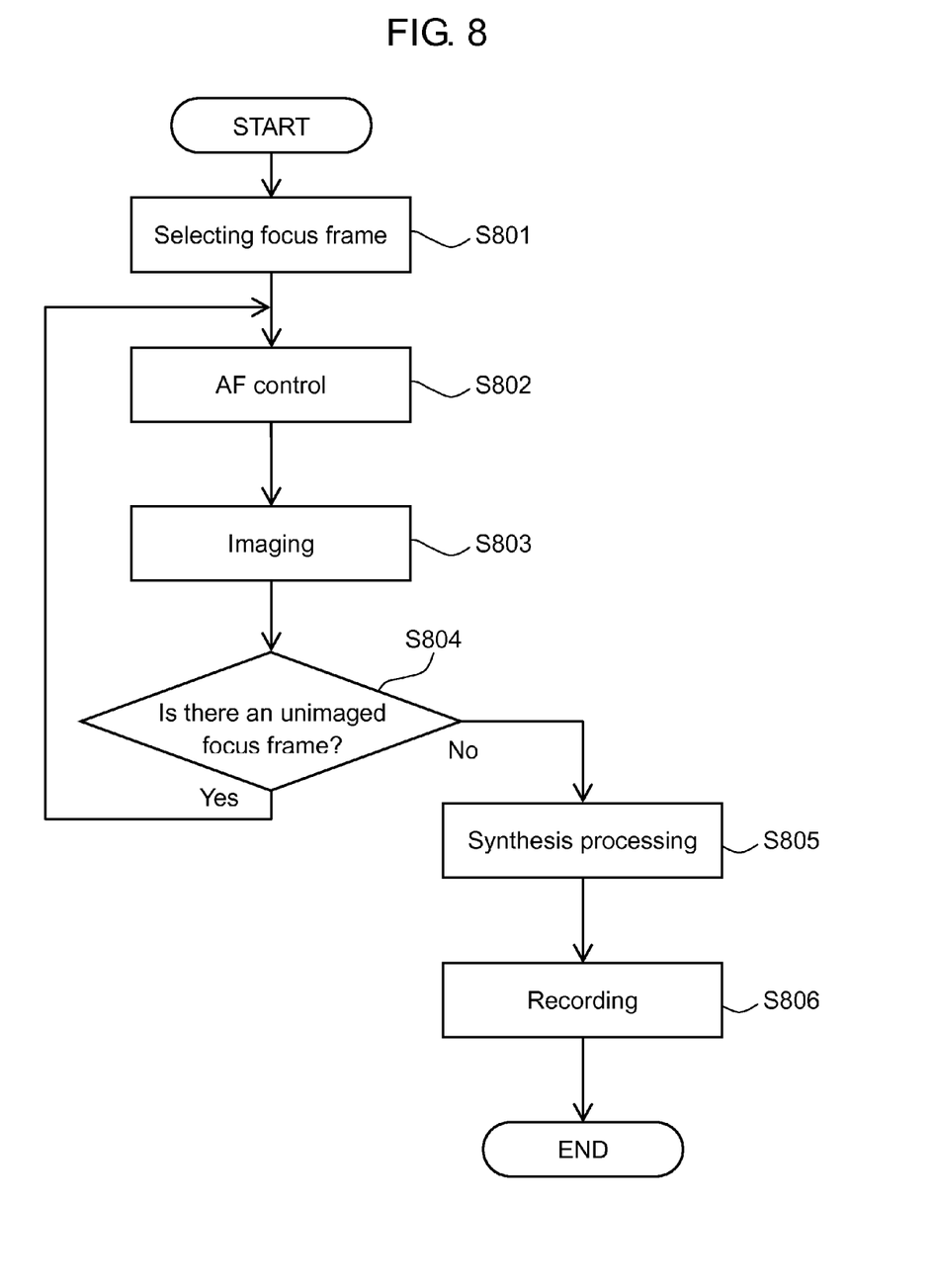
FIG. 8 is a flowchart of auto focusing control according to a second exemplary embodiment.

The operation of the present exemplary embodiment will be described with reference to FIG. 8. First, as in the first exemplary embodiment, the initialization processing is performed in the image-recording mode, and the setting of focus frame 162 is performed.

Figure 6:
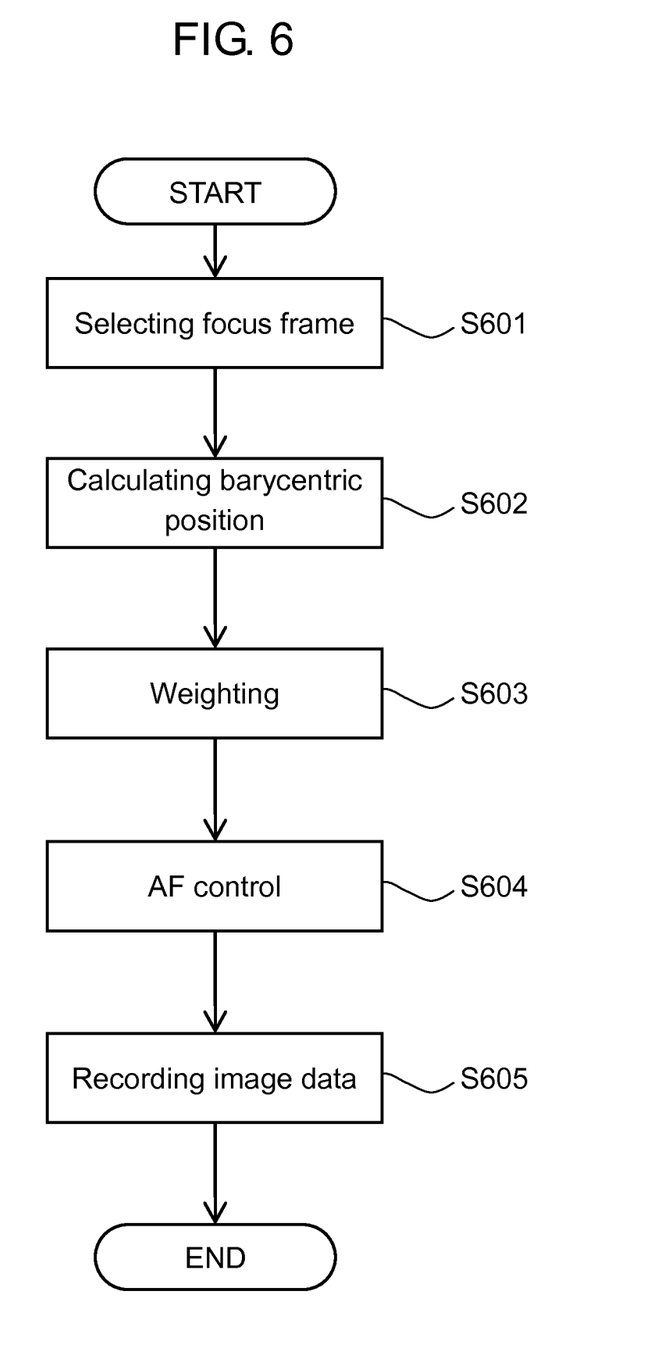
FIG. 6 is a flowchart of the auto focusing control according to the first exemplary embodiment.

Next, as in step S601 in FIG. 6, focus frames 162 are selected from focus area 161 according to the position where the user touches (step S801). In this case, controller 130 stores the order of focus frames 162 the user touches.

Next, accepting a full-push operation on still image release button 201 by the user, digital camera 100 performs an imaging operation. In the imaging operation, the AF control is performed on selected focus frames 162 in the order of decreasing precedence, and the imaging is performed. Here, the priority is set higher in the order in which the user touches the focus frames. Then first, the AF control is performed on focus frame 162 with the highest priority among selected focus frames 162 (step S802), and the imaging is performed (step S803). The image data that is imaged in step S803 is temporarily stored in buffer memory 124. Next, it is checked whether there is an unimaged focus frame 162 among all of selected focus frames 162 (step S804). If there is an unimaged focus frame 162 (Yes in step S804), the AF control is performed on focus frame 162 with the highest priority among the unimaged focus frames 162 (step S802), and the imaging is performed (step S803).

Although it has been described that the priority to perform the imaging in steps S802 and S803 is set higher in the order in which the user touches, the priority may be set in the order of closeness to barycentric position G shown in FIG. 7.

Controller 130 repeats the operation of steps S802 to S804 as many times as the number of focus frames 162 selected by the user, to obtain a series of images. Controller 130 stores the image data that is imaged for each of the selected focus frames 162 in buffer memory 124. It is desirable that the operation of steps S802 to S804 is performed as soon as possible so that the state of the object does not change significantly. That is, it is desirable that the operation of steps S802 to S804 is performed by high-speed continuous shooting.

When buffer memory 124 finishes storing the image data for all of selected focus frames 162 (No in step S804), controller 130 instructs image processor 122 to perform synthesis processing on all of the image data stored in buffer memory 124 (step S805). The synthesis processing by image processor 122 will be described in detail below. When the synthesis processing of image data is finished, controller 130 records the synthesized image data in memory card 140 or flash memory 142 (step S806).

Figure 9:
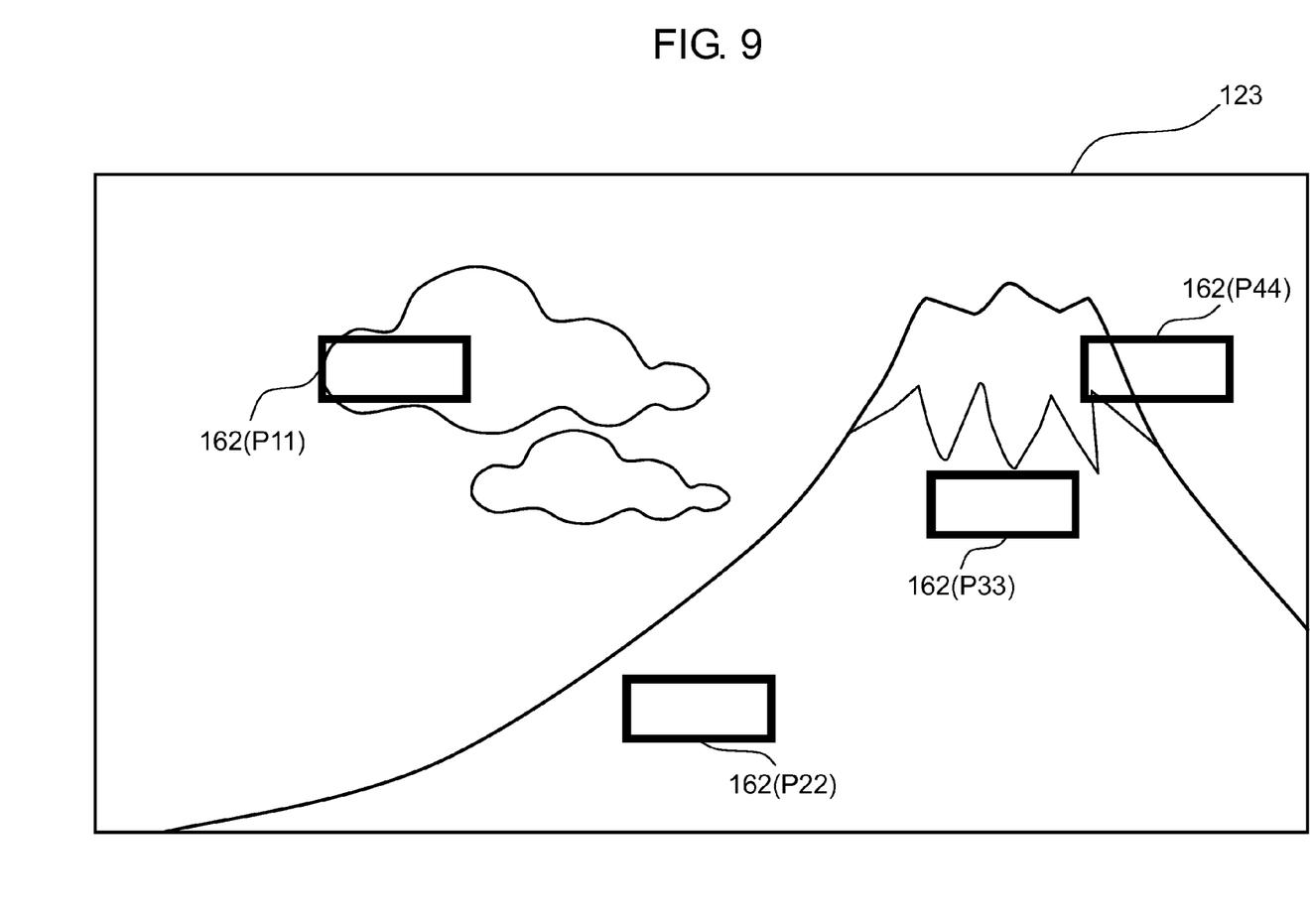
FIG. 9 is a schematic diagram of focus frame selection of the digital camera according to the second exemplary embodiment.

The image synthesis processing by image processor 122 will be described with reference to FIG. 9 and FIGS. 10A to 10E. As shown in FIG. 9, the user selects four focus frames 162 at positions P11, P22, P33, and P44 in this order. When the user selects focus frames 162, controller 130 stores the selection order of focus frames 162. When the user fully pushes still image release button 201 in this state, digital camera 100 starts the imaging.

Figure 10A:
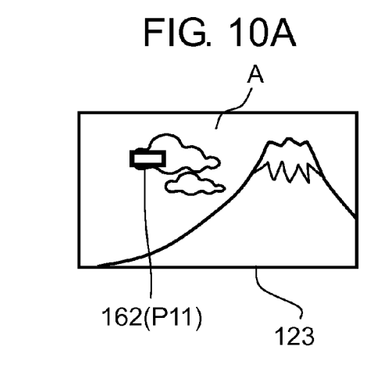
FIGS. 10A, 10B, 10C, 10D, and 10E are schematic diagrams showing an image synthesis of the digital camera according to the second exemplary embodiment.
Figure 10B:
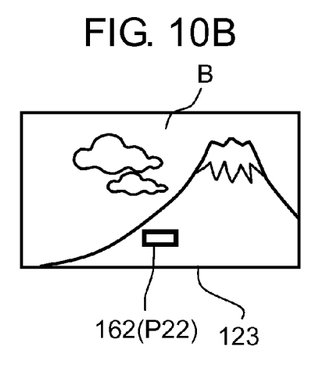
Figure 10C:
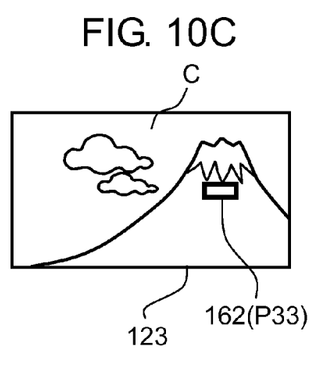
Figure 10D:
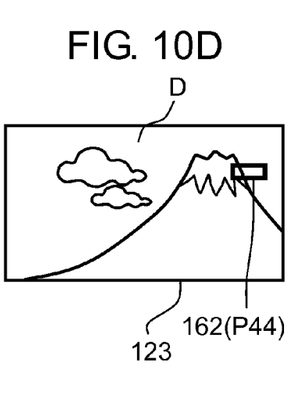

When the user fully pushes still image release button 201, controller 130 starts the AF control in focus frame 162 at position P11 that is selected first and has the highest priority. When the AF control is completed in focus frame 162 at position P11, digital camera 100 images image A that is focused on focus frame 162 at position P11 (FIG. 10A). Controller 130 records image A in buffer memory 124. Next, controller 130 similarly images image B in focus frame 162 at position P22 that is selected second and has the next highest priority, and records image B (FIG. 10B). Furthermore, controller 130 also similarly images image C in focus frame 162 at position P33 that is selected third and has the third highest priority, and records image C (FIG. 10C). Until image D (FIG. 10D), which is focused on focus frame 162 at position P44 that is lastly selected, is imaged and recorded, controller 130 repeatedly images the image that is focused on each of focus frames 162, and obtains a series of images.

When all of images A, B, C, and D which are shown in FIGS. 10A to 10D are recorded, controller 130 instructs image processor 122 to perform synthesis processing of the image data. In this case, as shown by a broken line in FIG. 10E, image processor 122 divides the image data so that each area includes one focus frame 162 corresponding to positions P11 to P44. In the present exemplary embodiment, the image data is divided with barycentric position G, which is calculated from the positions of the plurality of selected focus frames 162, as a reference. Specifically, barycentric position G is set as a base point, and the image area is divided by straight lines radially extending from the base point. For example, the division between the area including position P11 and the area including position P22 can be achieved by the division by a straight line extending from barycentric position G to the midpoint of a line segment connecting position P11 and position P22.

Figure 10E:
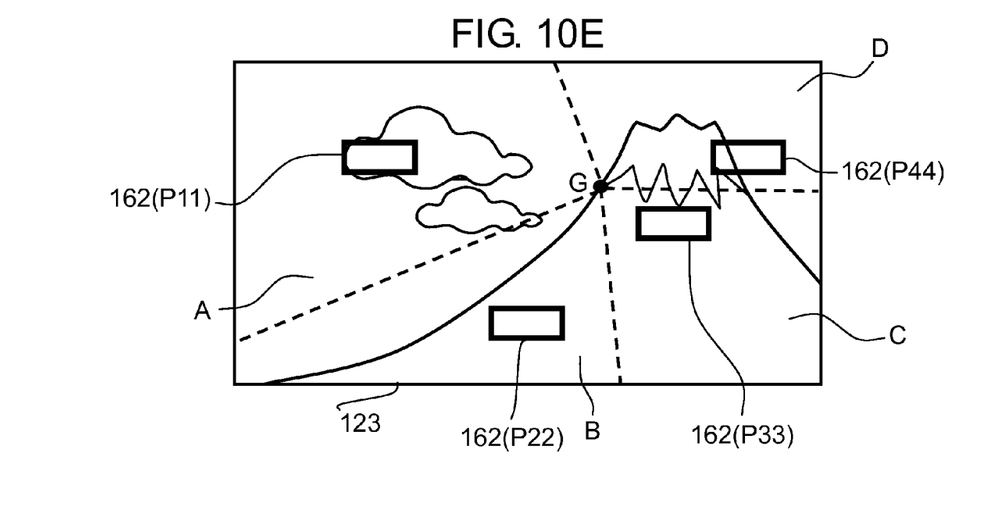

Then, image processor 122 synthesizes the image data by using, for each of the divided areas, an image that is focused on focus frame 162 included in the image area. Specifically, the synthesis processing is performed by using image A for the image data of the area including focus frame 162 at position P11, image B for the image data of the area including focus frame 162 at position P22, image C for the image data of the area including focus frame 162 at position P33, and image D for the image data of the area including focus frame 162 at position P44.

Note that the method of dividing the image area may not be the method using barycentric position G. For example, it is possible to divide the image area by using the object distance (Depth From Defocus) information and the like, to perform the synthesis.

[2-2. Effects and the Like]

As described above, by performing imaging on all of the frames selected by the user, and synthesizing the image data, it is possible to generate the image data that focuses on all of the selected frames.

3. Other Exemplary Embodiments

As above, the first and second exemplary embodiments are described as the exemplary technique disclosed in the present application. However, the technique in the present disclosure is not limited thereto, and can be also applied to the embodiments to which change, replacement, addition, omission, and the like are performed. It is also possible to form a new exemplary embodiment by combining each of the components described in the first and second exemplary embodiments. In the following, other exemplary embodiments will be exemplified.

Although the digital camera has been described to use the contrast AF control in the AF control in the first and second exemplary embodiments, the present disclosure is not limited thereto. The digital camera may use a phase difference AF control and the like in the AF control.

In addition, although the selection of focus frame 162 by the user has been described to use the touch operation in the first and second exemplary embodiments, the present disclosure is not limited thereto. The user may use the button operation (cross button, center button, and the like) when selecting focus frame 162.

Moreover, although the number of focus frames 162 in the focus area has been described as 49 frames in the first and second exemplary embodiments, the present disclosure is not limited thereto. It is sufficient to have a plurality of focus frames 162 which the user can select.

INDUSTRIAL APPLICABILITY

The present disclosure is applicable to a digital still camera, a movie camera, a mobile phone, a smart phone, a mobile PC, and the like.

What is claimed is:

1. An imaging apparatus comprising:
   an imaging sensor configured to generate image data by imaging an object image;
   a displaying monitor configured to display the image data and a focus area superimposed on the image data, the focus area being a set of a plurality of focus frames;
   a determination unit configured to determine a number and positions of arbitrary focus frames selected from the focus area; and
   a control unit configured to control the imaging sensor and the determination unit, and to perform focus processing on an image, and including a synthesis unit configured to perform image synthesis,
   wherein the control unit:
   performs the focus processing according to a plurality of selected focus frames when the determination unit determines that the plurality of selected focus frames are located at positions not adjacent to each other;
   performs the focus processing and the imaging on each of the plurality of selected focus frames, obtains a series of images, and synthesizes the series of images;
   divides an image area so that each of divided image areas includes one of the plurality of selected focus frames;
   synthesizes the series of images by using, for each of the divided image areas, the image data obtained by performing the focus processing on the one selected focus frame included in each of the divided image areas, respectively; and
   divides the image area by setting a barycentric position as a base point, the barycentric position being calculated based on the positions of the plurality of selected focus frames.

* * * * *